United States Patent
Syed et al.

(10) Patent No.: US 12,300,991 B2
(45) Date of Patent: May 13, 2025

(54) OVERSPEED AND/OR OVERTORQUE PROTECTION FOR HYBRID ELECTRIC AIRCRAFT PROPULSION SYSTEM

(71) Applicant: PRATT & WHITNEY CANADA CORP., Longueuil (CA)

(72) Inventors: Yusuf Syed, Oakville (CA); Thomas Trevor Ricci, Kirkland (CA); James Robert Jarvo, Long Sault (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 234 days.

(21) Appl. No.: 17/937,871

(22) Filed: Oct. 4, 2022

(65) Prior Publication Data
US 2024/0113513 A1   Apr. 4, 2024

(51) Int. Cl.
*H02H 7/08*   (2006.01)
*B60W 10/08*   (2006.01)

(52) U.S. Cl.
CPC .......... *H02H 7/0833* (2013.01); *B60W 10/08* (2013.01)

(58) Field of Classification Search
CPC .............................. H02H 7/0833; B60W 10/08
USPC ........................................................ 318/434
See application file for complete search history.

(56) References Cited

U.S. PATENT DOCUMENTS

| 8,464,980 | B2 | 6/2013 | Certain |
| 10,981,660 | B2 | 4/2021 | Mackin |
| 11,649,038 | B2 * | 5/2023 | Mark ...................... B64D 27/24 |
| | | | 180/65.285 |
| 11,958,622 | B2 * | 4/2024 | Poisson .................. B64D 31/02 |
| 2020/0271061 | A1 | 8/2020 | Kopeschka et al. |
| 2020/0277064 | A1 | 9/2020 | Thomassin et al. |
| 2020/0339268 | A1 * | 10/2020 | Mark ...................... B64D 27/02 |
| 2021/0101691 | A1 * | 4/2021 | Mark ...................... B64D 31/06 |
| 2021/0354837 | A1 | 11/2021 | Mark et al. |
| 2021/0354840 | A1 | 11/2021 | Mark et al. |
| 2021/0354841 | A1 | 11/2021 | Poisson et al. |
| 2022/0009615 | A1 | 1/2022 | Mark et al. |

* cited by examiner

Primary Examiner — Kawing Chan
(74) Attorney, Agent, or Firm — NORTON ROSE FULBRIGHT CANADA LLP

(57) ABSTRACT

A hybrid-electric powerplant (HEP) of an aircraft comprises a thermal engine providing a first torque input to the HEP and an electric motor providing a second torque input to the HEP. A power management system connected to one or both of the thermal engine and the electric motor comprises an engine control unit (ECU) connected to the thermal engine. The ECU controls fuel supplied to the thermal engine. An electric propulsion control (EPC) is connected to the electric motor and controls power supplied to the electric motor. The EPC includes an EPC protection module in communication with a power source for the electric motor. The EPC protection module disables power supplied to the electric motor upon receipt of a signal indicative of one or more of an over-speed condition and an over-torque condition detected in the HEP.

11 Claims, 6 Drawing Sheets

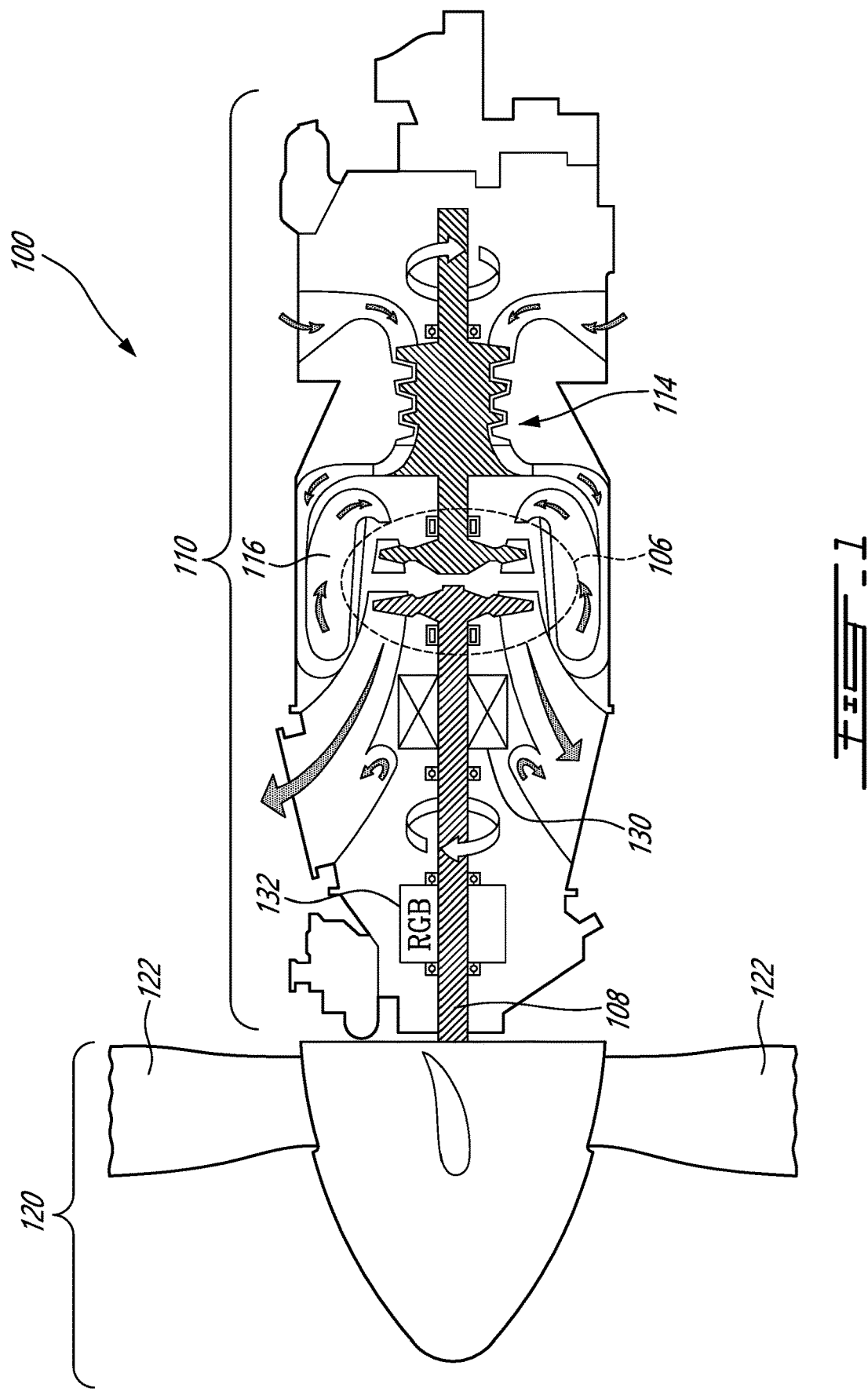

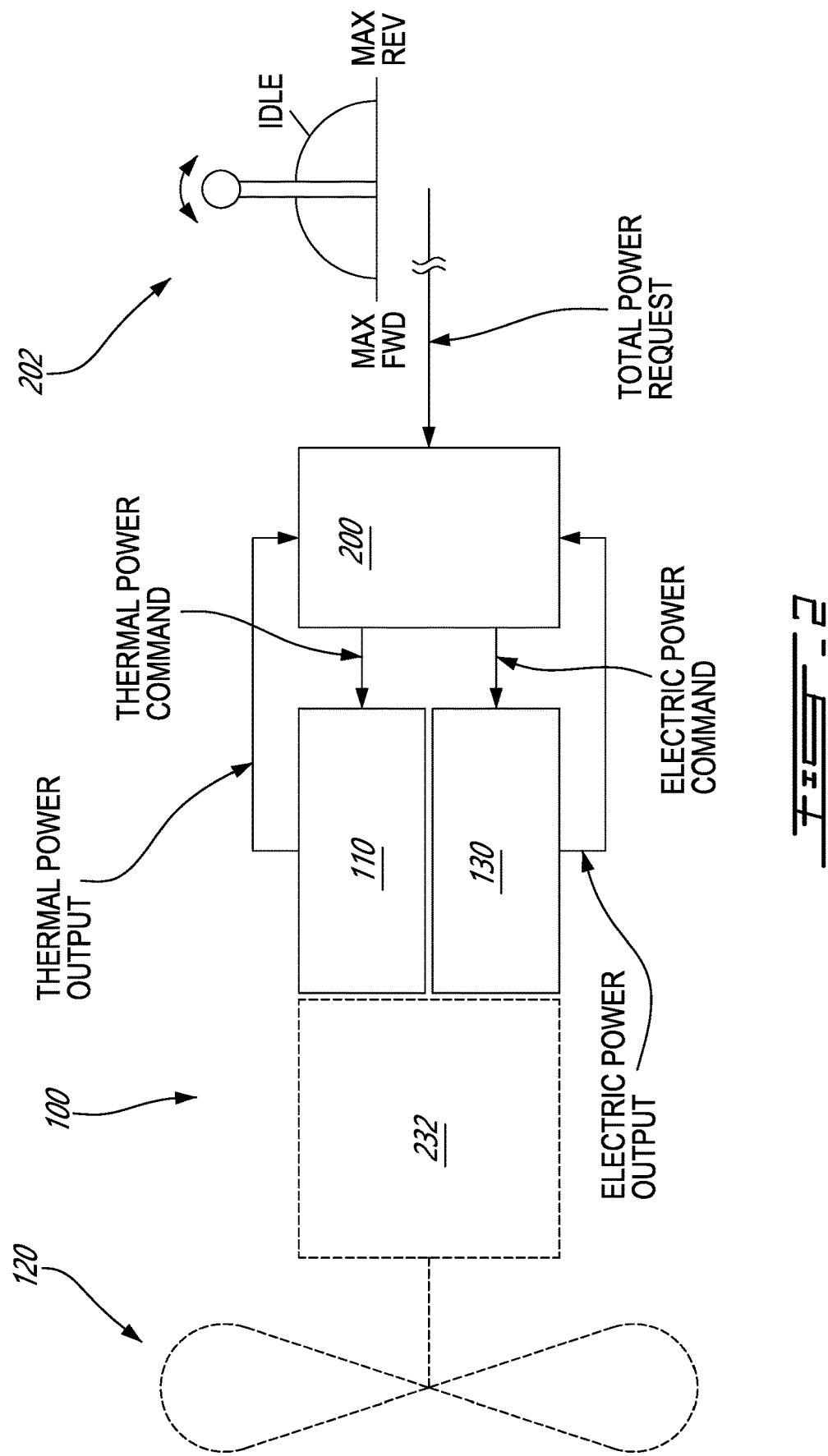

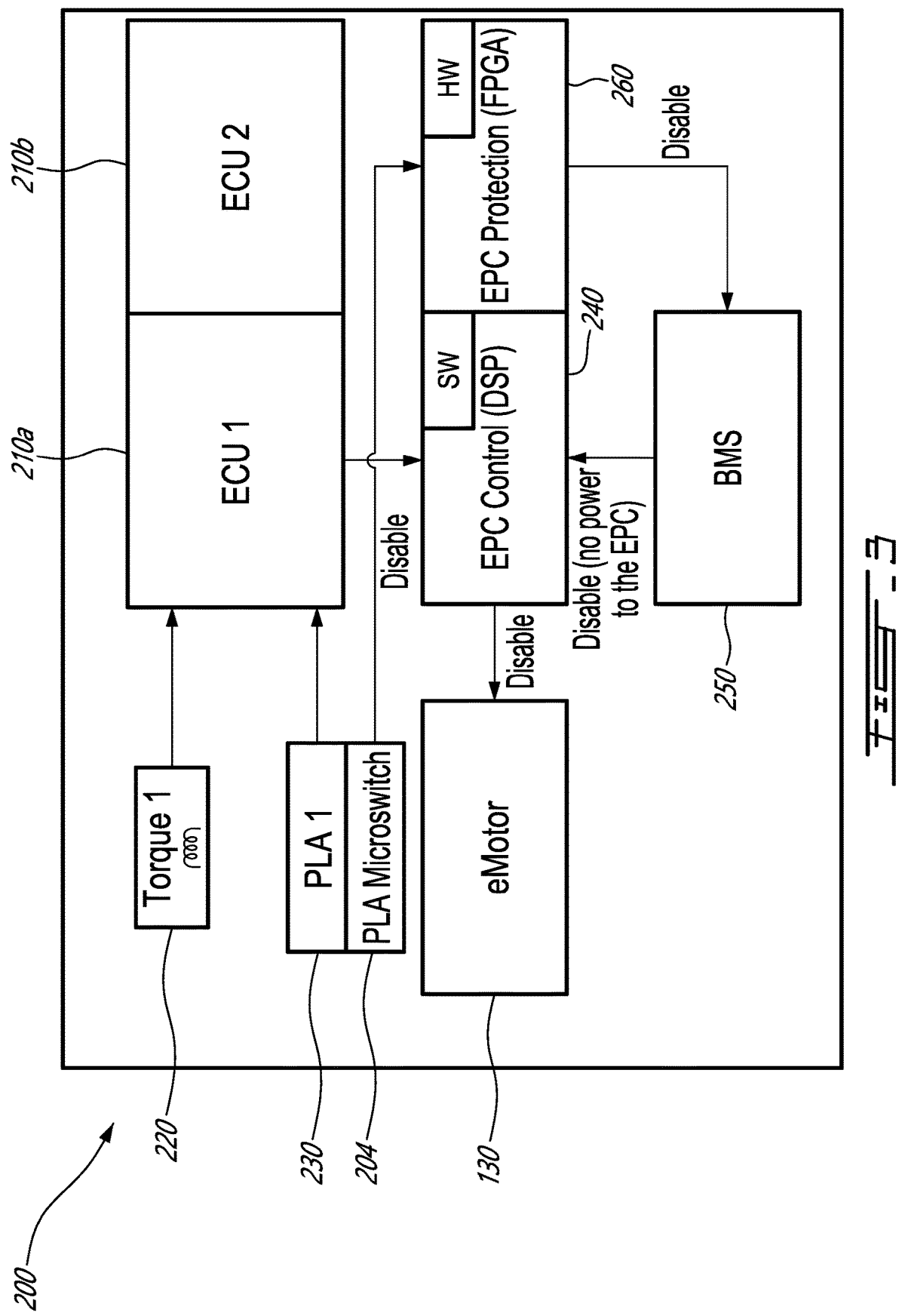

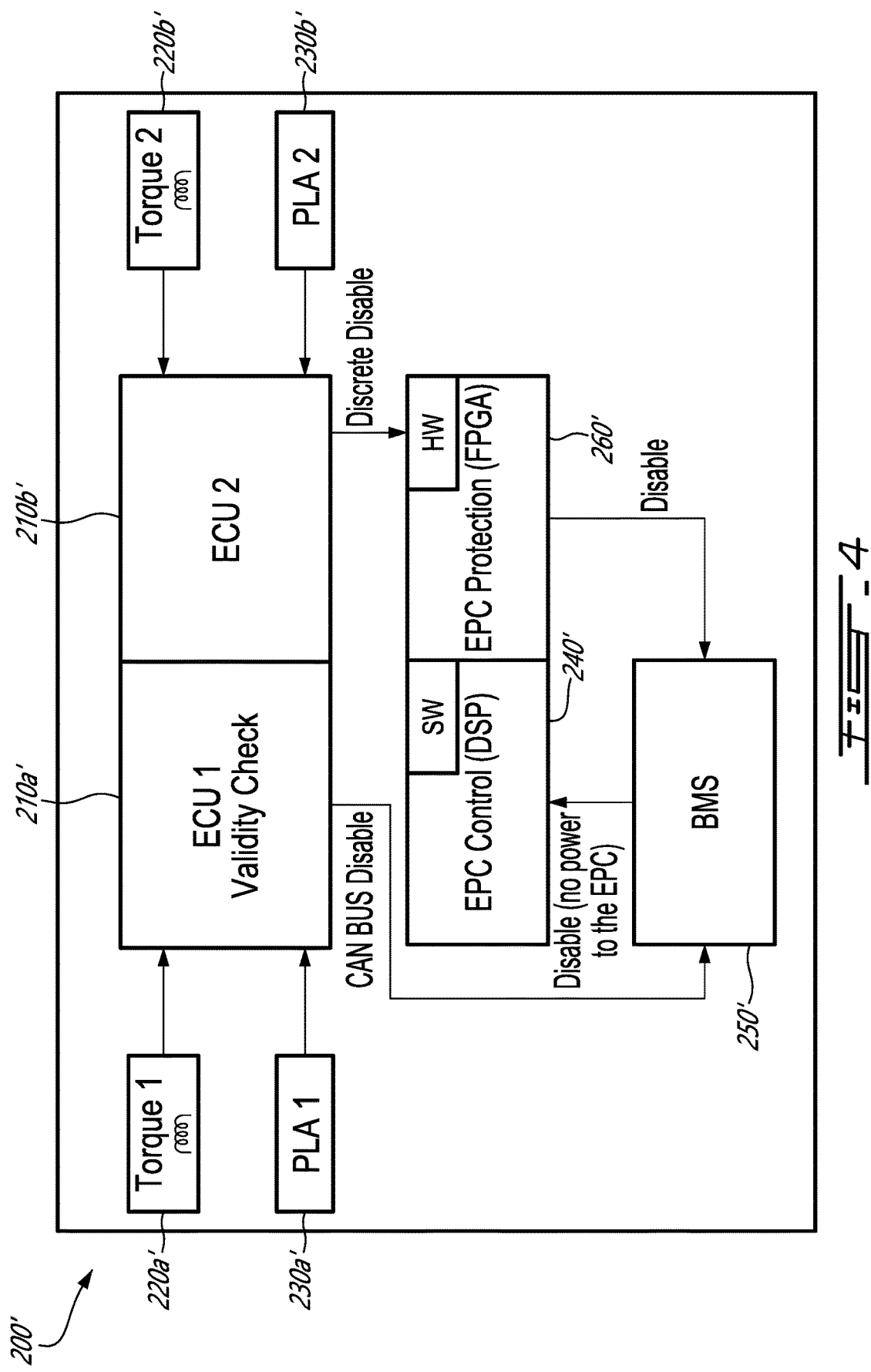

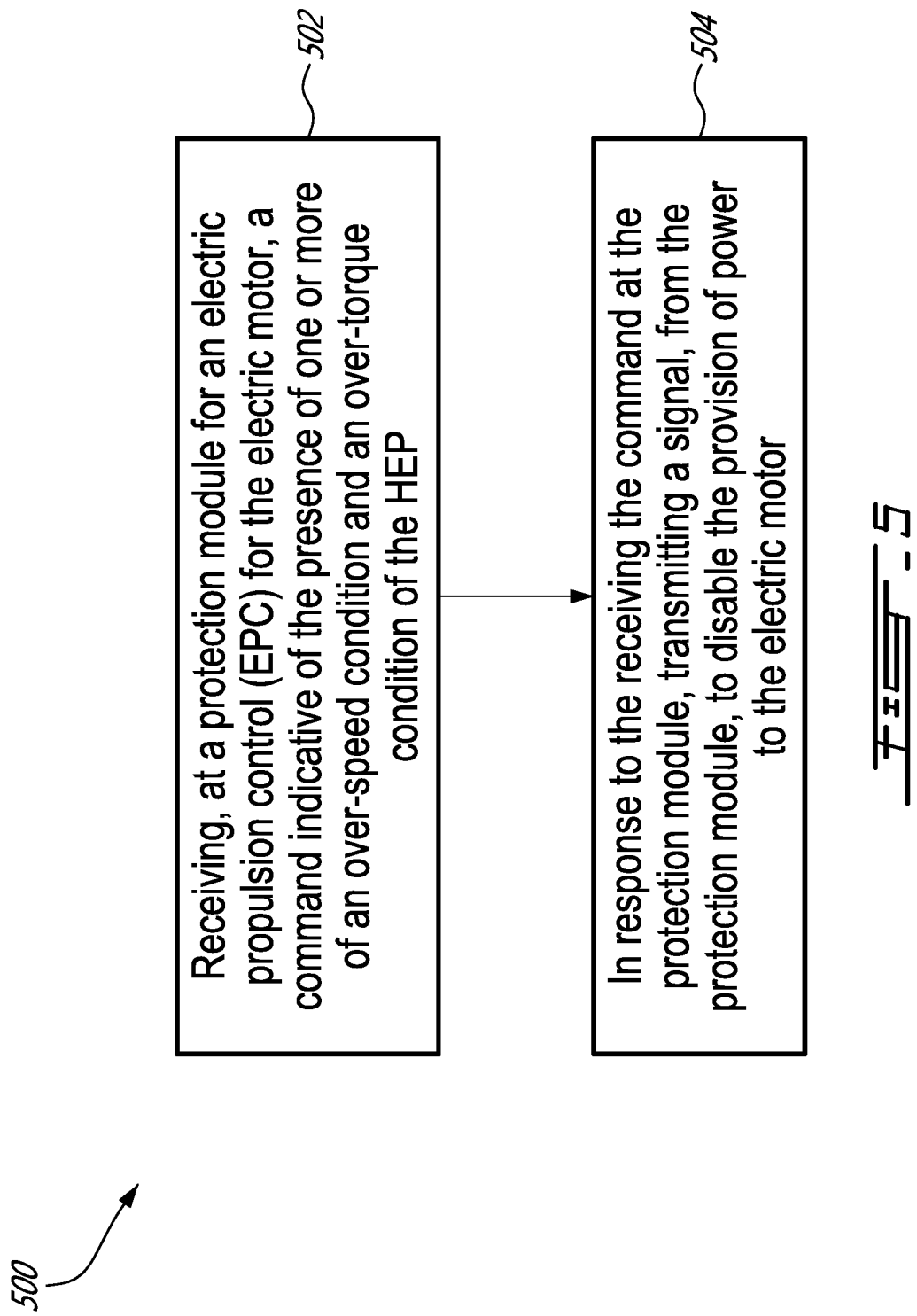

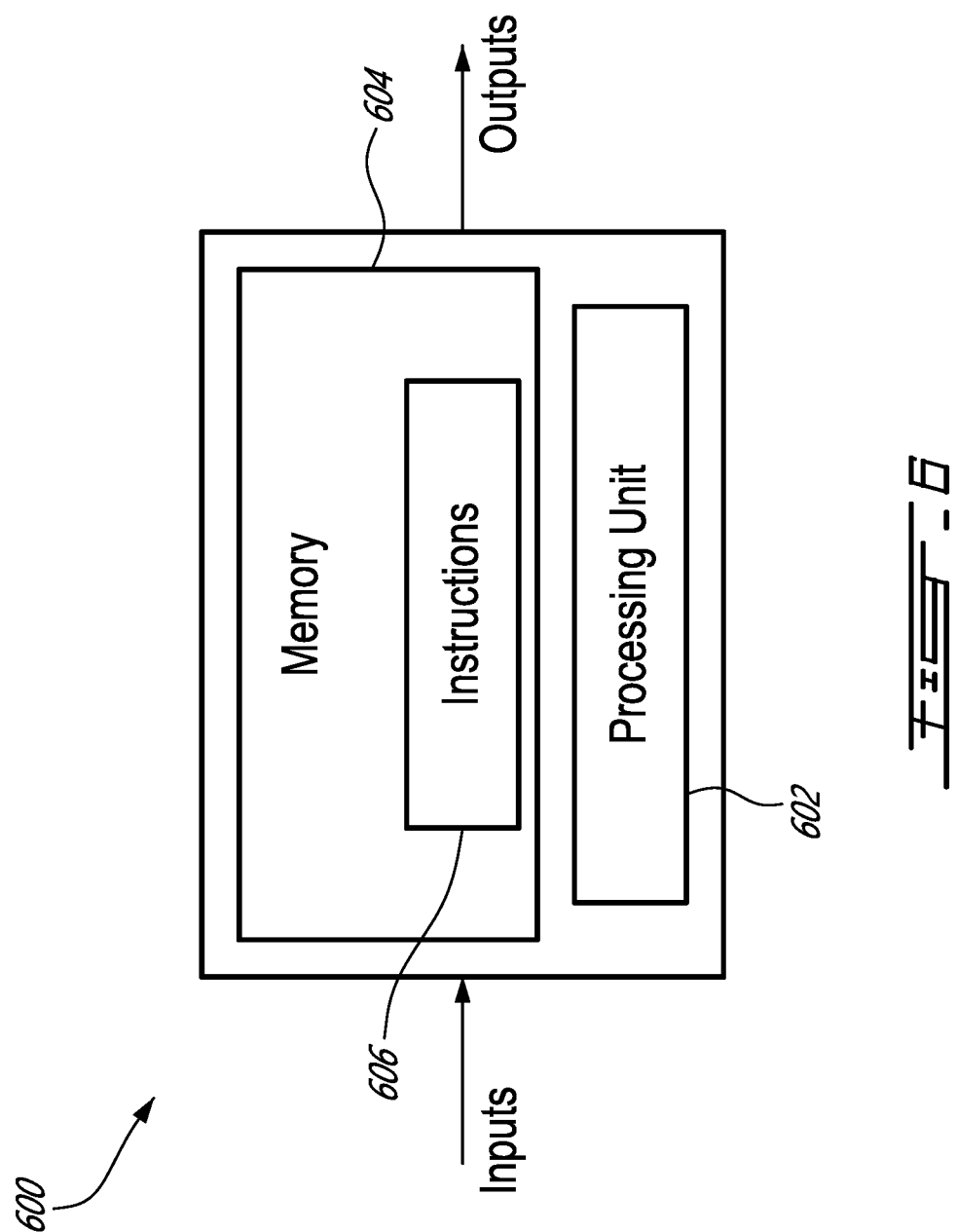

OVERSPEED AND/OR OVERTORQUE PROTECTION FOR HYBRID ELECTRIC AIRCRAFT PROPULSION SYSTEM

TECHNICAL FIELD

The disclosure relates generally to aircraft propulsion systems and, more particularly, to power management of a hybrid electric aircraft propulsion system having an electric motor and a thermal engine.

BACKGROUND

Hybrid electric powerplants combine combustion and electric propulsion technologies. In an electric propulsion system for an aircraft, electrical energy is converted to mechanical energy by an electric motor to drive a rotor, such as a fan, propeller, or main rotor for a helicopter or auxiliary power unit output shaft. There are environmental and cost benefits to having at least a portion of the power for an aircraft propulsion system come from electric motors.

While existing power management systems for hybrid electric powerplants are suitable for their purposes, improvements are desired.

SUMMARY

In one aspect, there is provided a hybrid-electric powerplant (HEP) of an aircraft, comprising: a thermal engine providing a first torque input to the HEP; an electric motor providing a second torque input to the HEP; a power management system connected to one or both of the thermal engine and the electric motor, the power management system comprising: an engine control unit (ECU) connected to the thermal engine, the ECU controlling fuel supplied to the thermal engine; and an electric propulsion control (EPC) connected to the electric motor, the EPC controlling power supplied to the electric motor, the EPC including an EPC protection module in communication with a power source for the electric motor, the EPC protection module disabling power supplied to the electric motor upon receipt of a signal indicative of one or more of an over-speed condition and an over-torque condition detected in the HEP.

In another aspect, there is provided a method for managing a hybrid-electric powerplant (HEP) comprising a thermal engine and an electric motor, comprising: receiving, at a protection module for an electric propulsion control (EPC) for the electric motor, a command indicative of the presence of one or more of an over-speed condition and an over-torque condition of the HEP; and in response to the receiving the command at the protection module, transmitting a signal, from the protection module, to disable the provision of power to the electric motor.

In another aspect, there is provided a power management system for a hybrid-electric powerplant (HEP) comprising a thermal engine and an electric motor, the power management system comprising at least one controller having at least one processor and a memory coupled thereto, the memory having stored thereon program instructions executable by the at least one processor for: receiving, at a protection module for an electric propulsion control (EPC) for the electric motor, a command indicative of the presence of one or more of an over-speed condition and an over-torque condition of the HEP; and in response to the receiving the command at the protection module, transmitting a signal, from the protection module, to disable the provision of power to the electric motor.

BRIEF DESCRIPTION OF THE DRAWINGS

Reference is now made to the accompanying figures in which:

FIG. 1 is a schematic cross sectional view of a hybrid electric powerplant;

FIG. 2 is a block diagram of the hybrid electric powerplant and a power management system for the hybrid electric powerplant;

FIG. 3 is block diagram of an example embodiment of the power management system;

FIG. 4 is block diagram of another example embodiment of the power management system;

FIG. 5 is a flowchart of an example method of power management for a hybrid electric powerplant; and FIG. 6 is a block diagram of an example computing device.

DETAILED DESCRIPTION

The present disclosure is directed to power management for an aircraft propulsion system having two or more power sources, such as a hybrid-electric powerplant (HEP) used in an aircraft propulsion system. On a traditional thermal engine, there is only one source of power. In the event of a fault affecting power output from the thermal engine or its associated control, there is no way to supplement power. With an HEP, power deviations from one power source may be mitigated by increasing or decreasing the power output from the other power source to accommodate the fault.

An example HEP 100 is shown in FIG. 1 and generally comprises a thermal engine 110, an electric motor 130 and a propeller 120. The thermal engine 110 is, in this example, a combustion engine, and more particularly a gas turbine engine. Other types of combustion engines, such as turboshaft and turbofan gas turbine engines, and internal combustion engines, may also be used for the thermal engine. Generally, the thermal engine 110 may be any system that converts heat or thermal energy to mechanical energy which can then be used to drive a load, such as the propeller 120. The load can also be a fan, rotor system, and the like. The electric motor 130 may be any type of electric motor, including an electric machine that can be driven as a motor or as a generator.

The propeller 120 is attached to a shaft 108. In the depicted embodiment, the thermal engine 110 includes, in serial flow communication, a compressor section 114 for pressurizing the air, a combustor 116 in which the compressed air is mixed with fuel and ignited for generating an annular stream of hot combustion gases, and a turbine section 106 for extracting energy from the combustion gases and driving the rotation of the propeller through the shaft 108. The propeller 120 converts rotary motion from the shaft 108 of the engine 110 to provide propulsive force for the aircraft, also known as thrust. The propeller 120 may be a variable-pitch propeller capable of generating forward and reverse thrust and comprises two or more propeller blades 122. For a propeller-driven propulsion system, the thermal engine 110 drives the propeller 120 via a reduction gearbox (RGB) 132.

Also coupled to the RGB 132 is the electric motor 130, which uses electricity to provide additional power that is converted to thrust via the RGB 132 towards the propeller 120. The HEP 100 thus includes two power sources, namely the electric motor 130 and the thermal engine 110, whose power is combined through the RGB 132 and used to drive the load (i.e. propeller 120). While the thermal engine 110 and the electric motor 130 are shown in this example to be coupled to the propeller 120 through the RGB 132, other configurations are also contemplated. For example, in a pusher-puller configuration, a propulsion unit having a thermal engine and an electric motor may be coupled to one or more loads without a gear box.

Referring to FIG. 2, a power management system 200 is coupled to the HEP 100, which includes the thermal engine 110, electric motor 130, and a common gearbox 232 (which can also provide the mechanical speed reduction typically provided by the reduction gearbox 132). The thermal engine 110 selectively provides a first torque input to the HEP 100, while the electric motor 130 selectively provides a second torque input to the HEP 100. A power request is received, for example from a power throttle 202 in an aircraft cockpit, at the power management system 200. The power throttle 202 may be an angularly displaceable power lever or a collective lever, and defines a power lever angle (PLA) or throttle lever angle representative of the power request. In some embodiments, the total power request may come from another aircraft or avionic system, or from an engine system or controller. For example, the power request may be sent from the power throttle 202 to another system which may then provide the information to the power management system 200. The power management system 200 converts the total power request into an electric power request and a thermal power request in accordance with a desired proportion of electric power and thermal power. The electric power request and thermal power requests are then converted into an electric power command and a thermal power command, respectively, which are used to drive the electric motor 130 and thermal engine 110, respectively. It will be understood that the breakdown between thermal power and electric power may vary anywhere between 0% to 100% for either power source.

In an exemplary embodiment, the initial power demand is satisfied only by the thermal engine 110. As the power demand exceeds the capacity of the thermal engine 110, the assistance of the electric motor 130 is used to complement the power output of the thermal engine 110. As the power demand is reduced, the assistance of the electric motor 130 is reduced as required.

Referring to FIG. 3, an embodiment of the power management system 200 is shown. The depicted power management system 200 includes an engine control unit (ECU) 210, illustratively a dual channel ECU 210 having a first channel ECU 1 210a and a second channel ECU 2 210b. In other embodiments, a single channel ECU 210 may be provided. The ECU 210 receives two inputs from the HEP 100 and aircraft: current torque 220, and a position of the power throttle 202, also referred to as power lever angle (PLA) 230. The ECU 210 may control operations of the thermal engine 110, for instance by controlling fuel supplied to the thermal engine 110. An electric propulsion controller (EPC) 240 is operatively coupled to a battery management system (BMS) 250 and the electric motor 130 to control the power supplied to the electric motor 130 from the BMS 250. In various embodiments, the ECU 210, EPC 240 and BMS 250 can be packaged together in one or more electronic controllers embodying both hardware and software.

The depicted power management system 200 further includes a protection module 260 for the EPC 240. Illustratively, the protection module 260 is a hardware channel of the software-based EPC 240. The protection module 260 is operable to disable the electric motor 130 based on the position of the power throttle 202 (i.e., the PLA 230), thereby preventing the electric motor 130 from applying immediate power or thrust under failure conditions, which can lead to undesirable rotor overspeed or overtorque. In various embodiments, the signal may be sent to the protection module upon detection, for instance by the ECU and/or by the pilot, of an overspeed condition and/or an overtorque condition in the HEP 100. A detected overspeed or overtorque condition may be understood as being at or after the onset of an overspeed or overtorque condition of the HEP 100. In an embodiment, the protection module 260 includes field programmable gate arrays (FPGAs). Various cases of failure may lead to such conditions, as the EPC 240 may send inadvertent signals to the EPC 240 indicating that the electric motor 130 should apply torque in cases where such torque is not needed. For instance, under low power levels, the propeller 120 is typically being controlled to a finer than usual blade angle when compared to high power operation. In the low power regime, the propeller 120 may be subjected to overspeed under failure conditions, given the reduced rotational drag of the blades. The EPC protection module 260 may therefore prevent this from occurring. Similarly, during aircraft flare maneuvers near the ground, a rapid application of torque on a propeller-driven aircraft may undesirably provide instantaneous lift. Rapid application of asymmetric power during this phase of flight could result in wing tip contact with the ground or a runaway excursion, resulting in a potentially catastrophic accident. The EPC protection module 260 may therefore prevent this from occurring.

In the shown embodiment, the power throttle 202 is provided with a microswitch 204 operable to detect a throttle position of the power throttle 202 (or PLA 230), below which the electric motor 130 would not be called upon to provide additional thrust or torque to supplement the thrust or torque provided by the thermal engine 110. Stated differently, the predetermined PLA may correspond to a PLA 230 below which the electric motor 130 is ordinarily, i.e., under normal operating conditions, in an inactive state. The microswitch 204 is operatively coupled to the EPC protection module 260 and provides a signal to the EPC protection module 260, that is independent and overriding of the software of any controller (i.e., the ECU 210 or the EPC 240), when the throttle position is at or below the predetermined throttle position. As such, based on the position of the PLA, the EPC protection module 260 can disable or de-activate the supply of electrical power from the BMS 250 to the EPC 240. Thus, in a power regime where the electric motor 130 is not expected to provide thrust or torque, the EPC protection module is operable to prevent the electric motor 130 from providing any thrust or torque, regardless of any signals from one or more controllers, stemming from a failure condition, prompting the electric motor 130 to unexpectedly and/or undesirably do so. In other embodiments, the microswitch 204 may be replaced with another sensor for detection the position of the power throttle 202, for instance a rotary variable differential transformer (RVDT) sensor or a Hall sensor. Therefore, below the specific throttle position of the PLA 230 at which the microswitch 204 (or other like sensor) is activated, the electric motor 130 will not be operational, regardless of any malfunctions that could lead to unintentional activation of the electric motor 130 that could otherwise lead to overspeed or overtorque conditions. The above-described system may be easily useable by a pilot of an aircraft, as they are trained to pulled back on the power throttle 202 to reduce power. This familiar action may now allow them to know with certainty that, beyond a certain angular position of the power throttle 202, the electric motor 130 will be deactivated through hardware means. In some embodiments, a deactivated electrical motor 130 may be reactivated when called upon to crank the HEP 100 to start the thermal engine 110, which may occur with the power throttle 202 at idle.

Referring to FIG. 4, another embodiment of a power management system 200' is shown. In this embodiment, the power throttle 202 is not provided with a microswitch, and overspeed and overtorque protection is realized through one channel of the ECU 210', illustratively ECU 2 210b', sending an electric discrete or other like signal to the EPC protection module 260' to prevent the BMS 250' from supplying power to the electric motor 130 (not shown in FIG. 4). The other channel of the ECU 210', illustratively ECU 1 210a', may send a command signal straight to the BMS 250', for instance over CANBUS, to prevent the BMS 250' from supplying power to the electric motor 130. A channel of the ECU 210', illustratively ECU 1 210a', may perform constant validity checks to determine if a failure condition is likely to occur, for instance based on one or more detected conditions, and if the disabling of the electric motor 130 is appropriate. A channel of the ECU 210', illustratively ECU 1 210a', may be operable to detect an overspeed condition and/or an overtorque condition in the HEP 100 and transmit a command to the protection module 260' in response. In the shown embodiment, the ECU 210' is operable to receive various torque and PLA inputs, illustratively torque 1 220a', torque 2 220b, PLA 1 230a' and PLA 2 230b'. Additionally or alternatively, the ECU 201' may be operable to receive various inputs such as PLA 1 230a', PLA 2 230b', torque 1 220a' and torque 2 220b', deduce a requested torque, compare the requested torque to an actual torque, and transmit the command to the protection module 260' if the requested and actual torques vary by a predetermined degree.

Referring to FIG. 5, there is shown an exemplary method 500 managing a hybrid-electric powerplant (HEP), for instance HEP 100, comprising a thermal engine 110 and an electric motor 130.

At step 502, a command is received, at a protection module 260 for an electric propulsion control (EPC) 240 for the electric motor 130, indicative of the presence of one or more of an over-speed condition and an over-torque condition of the HEP 100. In some embodiments, the command is received from a sensor, for instance microswitch 204, disposed at a predetermined position on a power throttle 202 for the HEP 100.

At step 504, in response to the receiving the command at the protection module 260, a signal is transmitted, from the protection module 260, to disable the provision of power to the electric motor 130. In some embodiments, the signal is transmitted from the protection module 260 to a battery management system (BMS) 250 for the electric motor 130.

In some embodiments, the method 500 further includes monitoring, an engine control unit (ECU) 210 of the HEP 100, one or more operating conditions of the HEP 100, and, in response to detecting a failure condition, transmitting the command to the protection module 260 to disable the provision of power to the electric motor 130.

The power management system 200 (or 200') may be implemented with one or more computing device 600, an example of which is illustrated in FIG. 6. For simplicity only one computing device 600 is shown but, for example, each controller may be implemented by one or more of the computing devices 600. The computing devices 600 may be the same or different types of devices. The various controllers can be implemented as part of a full-authority digital engine controls (FADEC) or other similar device, including electronic engine control (EEC), engine control unit (ECU), electronic propeller control, propeller control unit, and the like. The motor controller can be implemented as part of a motor controller (MC), electric motor controller (EMC), electric powertrain controller (EPC, as described above), and the like. Other embodiments may also apply.

The computing device 600 comprises a processing unit 602 and a memory 604 which has stored therein computer-executable instructions 606. The processing unit 602 may comprise any suitable devices configured to implement the method 500 such that instructions 606, when executed by the computing device 600 or other programmable apparatus, may cause the functions/acts/steps performed as part of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for power management of an HEP described herein may be implemented in a high level procedural or object oriented programming or scripting language, or a combination thereof, to communicate with or assist in the operation of a computer system, for example the computing device 600. Alternatively, the methods and systems for power management may be implemented in assembly or machine language. The language may be a compiled or interpreted language. Program code for implementing the methods and systems for power management may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for power management may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A hybrid-electric powerplant (HEP) of an aircraft, comprising:
   a thermal engine providing a first torque input to the HEP;
   an electric motor providing a second torque input to the HEP;
   a power throttle; and
   a power management system connected to one or both of the thermal engine and the electric motor, the power management system operable to receive a power request from the power throttle and convert the power request into an electric power command to drive the electric motor and a thermal power request to drive the thermal engine, the power management system comprising:
      an engine control unit (ECU) connected to the thermal engine, the ECU controlling fuel supplied to the thermal engine;
      an electric propulsion control (EPC) connected to the electric motor, the EPC controlling power supplied to the electric motor, the EPC including an EPC protection module in communication with a power source for the electric motor, the EPC protection module disabling power supplied to the electric motor upon receipt of a signal produced following a pilot-generated command in response to one or more of an over-speed condition and an over-torque condition detected in the HEP; and
      a sensor operable to detect a throttle position of the power throttle, the sensor operatively connected to the EPC protection module and operable to produce the signal when the throttle position is at or below a predetermined throttle position, the signal independent and overriding of the electric power command.

2. The HEP as defined in claim 1, wherein the power throttle includes a power lever that is angularly displaceable, the sensor operable to detect a power lever angle (PLA) of the power lever.

3. The HEP as defined in claim 2, wherein the predetermined throttle position corresponds to a fixed PLA below which the electric motor is ordinarily in an inactive state.

4. The HEP as defined in claim 1, further comprising a battery management system (BMS) for the electric motor, the BMS operable to receive the signal from the EPC protection module and disable a provision of power to the electric motor.

5. A method for managing a hybrid-electric powerplant (HEP) comprising a thermal engine and an electric motor, comprising:
   receiving, at a power management system connected to one or both of the thermal engine and the electric motor, a power request from a power throttle, and converting the power request into an electric power command to drive the electric motor and a thermal power request to drive the thermal engine;
   receiving, at a protection module for an electric propulsion control (EPC) for the electric motor, a signal produced following a pilot-generated command in response to the presence of one or more of an over-speed condition and an over-torque condition of the HEP, the signal produced by a sensor operable to detect a throttle position of the power throttle, the sensor operatively connected to the protection module and operable to produce the signal when the throttle position is at or below a predetermined throttle position, the signal independent and overriding of the electric power command; and
   in response to the receiving the signal at the protection module, disabling, by the protection module, the provision of power to the electric motor.

6. The method as defined in claim 5, wherein the power throttle includes a power lever that is angularly displaceable, the sensor operable to detect a power lever angle (PLA) of the power lever.

7. The method as defined in claim 6, wherein the predetermined throttle position corresponds to a fixed PLA below which the electric motor is ordinarily in an inactive state.

8. The method as defined in claim 5, wherein disabling the provision of power to the electric motor includes transmitting a disablement signal from the protection module to a battery management system (BMS) for the electric motor.

9. A power management system for a hybrid-electric powerplant (HEP) comprising a thermal engine and an electric motor, the power management system comprising at least one controller having at least one processor and a memory coupled thereto, the memory having stored thereon program instructions executable by the at least one processor for:
  receiving, at the power management system connected to one or both of the thermal engine and the electric motor, a power request from a power throttle, and converting the power request into an electric power command to drive the electric motor and a thermal power request to drive the thermal engine;
  receiving, at a protection module for an electric propulsion control (EPC) for the electric motor, a signal produced following a pilot-generated command in response to the presence of one or more of an overspeed condition and an over-torque condition of the HEP, the signal produced by a sensor operable to detect a throttle position of the power throttle, the sensor operatively connected to the protection module and operable to produce the signal when the throttle position is at or below a predetermined throttle position, the signal independent and overriding of the electric power command; and
  in response to the receiving the signal at the protection module, disabling, by the protection module, the provision of power to the electric motor.

10. The power management system as defined in claim 9, wherein the power throttle includes a power lever that is angularly displaceable, the sensor operable to detect a power lever angle (PLA) of the power lever.

11. The power management system as defined in claim 10, wherein the predetermined throttle position corresponds to a fixed PLA below which the electric motor is ordinarily in an inactive state.

* * * * *